United States Patent
Moncayo

(10) Patent No.: US 10,403,054 B2
(45) Date of Patent: Sep. 3, 2019

(54) DECONSTRUCTING AND RECOMBINING THREE-DIMENSIONAL GRAPHICAL OBJECTS

(71) Applicant: MICROSOFT TECHNOLOGY LICENSING, LLC, Redmond, WA (US)

(72) Inventor: Silvana Patricia Moncayo, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/475,582

(22) Filed: Mar. 31, 2017

(65) Prior Publication Data

US 2018/0286139 A1 Oct. 4, 2018

(51) Int. Cl.
*G06T 19/20* (2011.01)

(52) U.S. Cl.
CPC ...... *G06T 19/20* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 5,864,482 A * | 1/1999 | Hazama | G05B 19/4097 700/182 |
| 6,725,184 B1 | 4/2004 | Gadh et al. | |
| 9,324,190 B2 | 4/2016 | Bell et al. | |
| 9,665,800 B1 * | 5/2017 | Kuffner, Jr. | G06T 15/50 |
| 2008/0243445 A1 * | 10/2008 | Herman | G06F 17/5004 703/1 |
| 2011/0279445 A1 | 11/2011 | Murphy et al. | |
| 2012/0019621 A1 | 1/2012 | Song et al. | |
| 2013/0163811 A1 * | 6/2013 | Oelke | G06K 9/46 382/103 |

(Continued)

FOREIGN PATENT DOCUMENTS

WO 2015140815 A1 9/2015

OTHER PUBLICATIONS

"Tutorial on How to extract 3D models from Google Earth to get dimensions/proportions of building", http://community.simtropolis.com/forums/topic/69935-tutorial-on-how-to-extract-3d-models-from-google-earth-to-get-dimensionsproportions-of-building/, Published on: Feb. 20, 2016, 5 pages.

(Continued)

*Primary Examiner* — Xiao M Wu
*Assistant Examiner* — Steven Z Elbinger
(74) *Attorney, Agent, or Firm* — Shook, Hardy & Bacon LLP

(57) ABSTRACT

Aspects of the technology described herein provide for generating a customized three-dimensional (3D) graphical object. A 3D graphical object is retrieved from a 3D map application and a plurality of 3D components that comprise the 3D graphical object is determined. A selection of a first 3D component of the plurality of 3D components is received. The first 3D component is replaced with a second 3D component, and a customized 3D object is provided. The customized 3D object includes the second 3D component in place of the first 3D component.

20 Claims, 8 Drawing Sheets

(56) References Cited

U.S. PATENT DOCUMENTS

| | | | |
|---|---|---|---|
| 2014/0095122 A1* | 4/2014 | Appleman | G06T 19/003 |
| | | | 703/1 |
| 2014/0229143 A1* | 8/2014 | Cohen-Or | G06T 17/10 |
| | | | 703/1 |
| 2015/0221074 A1 | 8/2015 | Simhoni | |
| 2016/0019270 A1* | 1/2016 | Jones | G06F 17/30554 |
| | | | 700/98 |
| 2017/0052747 A1* | 2/2017 | Cervelli | G06F 3/0482 |
| 2017/0103584 A1* | 4/2017 | Vats | G06T 19/20 |
| 2018/0053343 A1* | 2/2018 | Ren | G06T 15/04 |

OTHER PUBLICATIONS

Desouza, Clyde, "Where's the Augmented Reality Button on Google Maps and Google E-AR-TH?", https://www.linkedin.com/pulse/wheres-augmented-reality-button-google-maps-e-ar-th-clyde-desouza?articleId=7967140105570202200, Published on: Aug. 18, 2016, 3 pages.

McGoogan, Cara, "Startup eeGeo is mapping the entire world in 3D", http://www.telegraph.co.uk/technology/2016/03/17/startup-eegeo-is-mapping-the-entire-world-in-3d/, Published on: Mar. 26, 2016, 19 pages.

"Combine and convert 3D objects", https://helpx.adobe.com/photoshop/using/combining-converting-3d-objects.html, Retrieved on: Feb. 1, 2017, 4 pages.

Veldhuizen, Bart, "Creating interactive 3D Maps with OpenStreetMap and Sketchfab", https://blog.sketchfab.com/creating-interactive-3d-maps-with-openstreetmap-and-sketchfab/, Published on: Jan. 13, 2015, pages.

* cited by examiner

DECONSTRUCTING AND RECOMBINING THREE-DIMENSIONAL GRAPHICAL OBJECTS

BACKGROUND

Existing tools provide limited capabilities for creating a three-dimensional object in response to user input. Some tools require a user to build the three-dimensional object from scratch in a three-dimensional drawing application, such as a computer-aided design ("CAD") program. This exceeds the technical skill set of an average user. Other tools allow a user to copy and paste an existing three-dimensional object and then make minor changes to the appearance of the object, such as altering its color or rotating its position. However, such tools do not enable the user to make more significant changes.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein provide for generating a customized three-dimensional (3D) object. In an exemplary aspect, existing 3D objects are retrieved from a map application and broken down into multiple 3D components. A customized 3D object is generated from a selection of these 3D components in response to user input. A user may search for 3D content that is to be used in generating the customized 3D object based on a variety of parameters. This includes searching for 3D content that is similar to a particular 3D object.

BRIEF DESCRIPTION OF THE DRAWINGS

Aspects of the disclosure are described in detail below with reference to the attached drawing figures, wherein.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are generally directed to systems, methods, and computer storage media that provide for, among other things, generating a customized 3D object. The technology described herein utilizes existing 3D objects, such as 3D objects included in 3D maps, to create customized 3D objects based on user input. For example, a computing device receives an indication of existing 3D objects that are to be used to create a customized 3D object. In response to the user input, the computing device retrieves the existing 3D objects, deconstructs the existing 3D objects into smaller 3D components, and generates a customized 3D object utilizing a combination of the smaller 3D components. Accordingly, aspects hereof advantageously provide for an improved understanding of user input involving a selection of existing 3D objects, as well as an improved understanding of the individual components that make up a 3D object.

This technology is useful for average users, because these users can create customized 3D objects without the need to use advanced CAD programs. This is also useful for more technically advanced users. For example, an architect might create a customized 3D object in accordance with the technology described herein, and then use the customized 3D object as inspiration for an architectural design.

Figure 8:
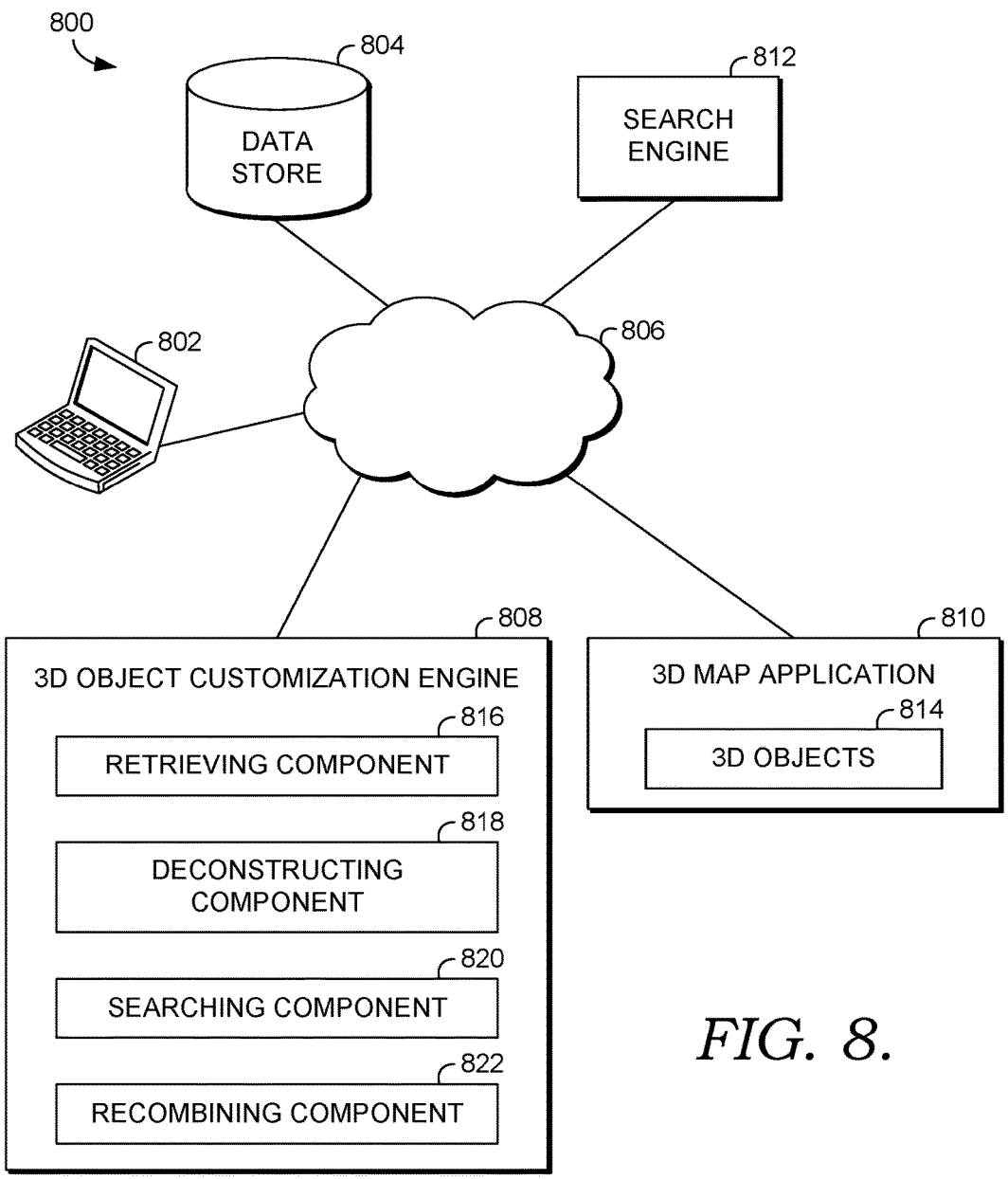
FIG. 8 is a block diagram illustrating an exemplary system for generating customized 3D objects, in accordance with aspects of the present disclosure.

Turning first to FIG. 8, a block diagram illustrating an exemplary system 800 for facilitating the generation of customized 3D objects is provided, in accordance with implementations of the present disclosure. The system 800 is an example of a suitable architecture for implementing certain aspects of the present disclosure. Among other components not shown, the system 800 includes a user device 802 interacting with a 3D object customization engine 808, a 3D map application 810, a search engine 812, and a data store 804 to generate a customized 3D object. Each of the components shown in FIG. 8 can be provided on one or more computer devices, such as the computing device 900 of FIG. 9, discussed below. As shown in FIG. 8, the user device 802, the 3D object customization engine 808, the 3D map application 810, the search engine 812, and the data store 804 can communicate via the network 806, which may include, without limitation, one or more local area networks (LANs) and/or wide area networks (WANs). The network 806 may further include a cloud computing network, such as a public cloud, a private cloud, and/or a dedicated cloud. Such networking environments are commonplace in offices, enterprise-wide computer networks, intranets and the Internet.

In some embodiments, one or more of the illustrated components and/or modules may be implemented as stand-alone applications. In further embodiments, one or more of the illustrated components and/or modules may be implemented via a computing device, as an Internet-based service, and/or as a module within the 3D object customization engine 808. It will be understood by those of ordinary skill in the art that the components and modules illustrated in FIG. 8 are exemplary in nature and in number and should not be construed as limiting. Any number of components and/or modules may be employed to achieve the functionality described herein. For example, any number of user devices, 3D object customization engines 808, 3D map applications 810, search engines 812, and data stores 802 may be employed within the system 800 within the scope of the present invention. Each may comprise a single device or multiple devices cooperating in a distributed environment. In some instances, the 3D object customization engine 808, 3D map application 810, search engine 812, and/or data store 104 may reside locally on the user device 802. Other components not shown may also be included within the network environment.

Additionally, there may be overlap among the modules illustrated in FIG. 8. For example, there may be overlap between the functionality provided by the 3D map application 810 and the 3D object customization engine 808. In some instances, the functionality discussed with respect to the 3D map application 810 and the 3D object customization engine 808 may be provided by a single, integrated entity, such as a single application. Additionally or alternatively, the functionality discussed with respect to the 3D map application 810 and the 3D object customization engine 808 may be provided by different entities, such as separate applications.

It should be understood that this and other arrangements described herein are set forth only as examples. Other arrangements and elements (e.g., machines, interfaces, functions, orders, and/or groupings of functions) can be used in addition to, or instead of, those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions, including the functions described below with respect to the computing system 800, may be carried out by a processor executing instructions stored in memory.

Figure 1A:
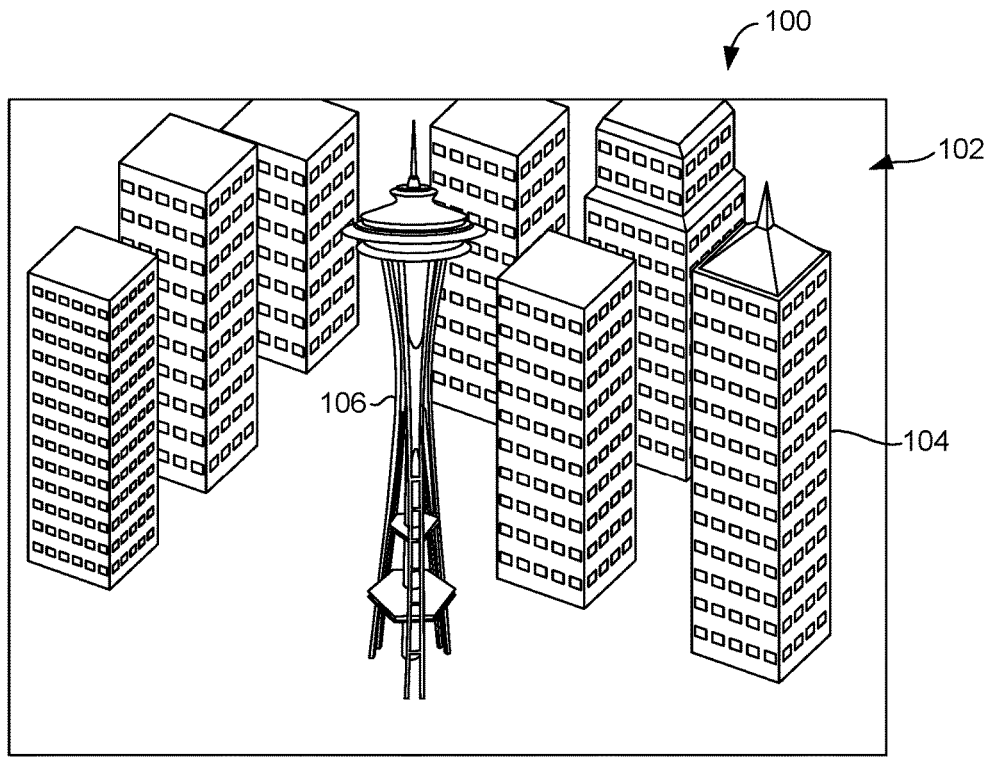
FIG. 1A shows a view of a 3D map that includes 3D objects, in accordance with aspects of the present disclosure.

Turning now to FIG. 1A, a view of a 3D map 100 is provided. This view may be generated by the 3D map application 810, which stores 3D objects 814 that are available for capture. The 3D map illustrated in FIG. 1A includes a 3D environment 102 having 3D objects 104 and 106, among others. In this example, the 3D environment 102 is a portion of Seattle, Wash., and the 3D object 106 is the Space Needle.

A user may wish to capture 3D content from the 3D map and use that content for creating a customized 3D object. Accordingly, the user may enter a "remix" mode of the map application 810. Upon entering the "remix" mode, a visual indication of the 3D objects 814 within the 3D map that are available for capture may be provided. For example, a 3D object that can be captured and used as a source of 3D content for creating a customized 3D object may be highlighted so that a user can quickly identify the 3D objects that are available for capture. Additionally or alternatively, a user may indicate a portion of the map that the user wishes to select, such as by drawing a boundary around the desired portion with a selection tool.

Figure 1B:
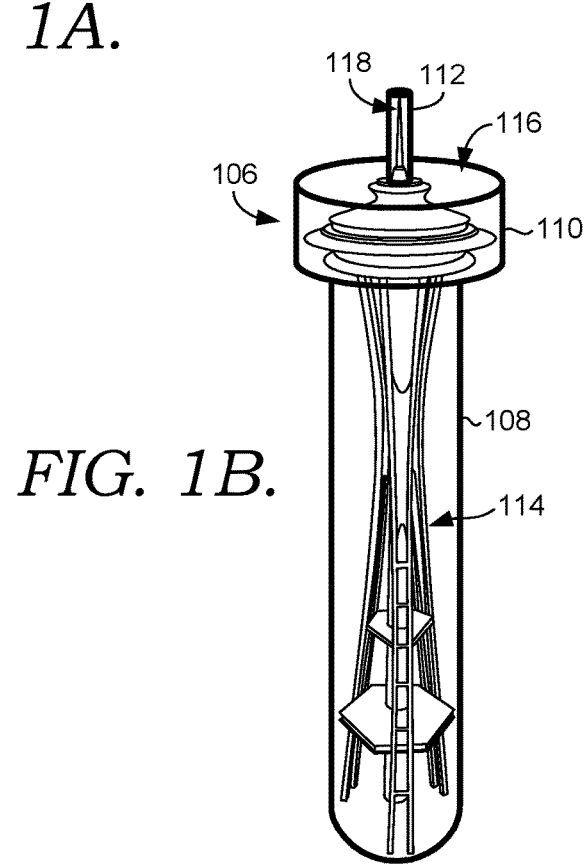
FIG. 1B shows a 3D object from the 3D map of FIG. 1A, wherein the 3D object has been broken down into multiple components, in accordance with aspects of the present disclosure.

In the example shown in FIG. 1A, suppose a user wishes to use the Space Needle as a source of 3D content. The user thus selects the 3D object 106 using a stylus, finger, mouse, gesture, keyboard, or other means of input that indicates a command to select the 3D object 106. In response to the selection of the 3D object 106, the 3D object 106 may appear in a "remix" window of the map application 810, and the map application, itself, may include the deconstructing and recombining technology discussed below. Additionally or alternatively, the 3D object 106 may be transferred from the map application to a separate application, such as a 3D drawing application, that provides the deconstructing and recombining technology discussed below. For example, the user may copy and paste the 3D object 106, import a file that includes the 3D object 106, provide a command that causes the 3D object 106 to be redrawn, or transfer the 3D object by any other means. In either instance, the 3D object 106 may be isolated from the remainder of the 3D environment 102, as shown in FIG. 1B. The application that provides the deconstructing and recombining technology, whether it be the map application, itself, or a separate application, is referred to herein as a 3D object customization application, and its functionality is discussed with respect to the 3D object customization engine 808. Accordingly, in response to a user selection of the 3D object 106, the retrieving component 816 of the 3D object customization engine 808 may retrieve the 3D object 106 from among the 3D objects 814 at the map application 810.

The selected 3D object 106 may be broken down into multiple 3D components by the deconstructing component 818. FIG. 1B shows the 3D object 106 broken down into three different 3D components—a first tier 114, a second tier 116, and a third tier 118. These three different 3D components are exemplary only; the 3D object 106 may be broken down into any number of components. For example, each leg of the Space Needle in the first tier 114 may be its own component; the elevator in the middle of the legs may be its own component; each ring in the second tier 116 may be its own component. Accordingly, a 3D object may be broken down into as many or as few components as are desired.

The deconstruction of the 3D object 106 into smaller 3D components may be provided automatically (i.e. without requiring manual input from a user) by the deconstructing component 818 in several ways. A visual tree for the 3D object (e.g., a visual tree used for rendering the object), which includes an indication of individual 3D components may be referenced and used to determine individual 3D components. Collections of pixels may be analyzed, and it may be determined that a particular collection resembles a 3D geometric shape. Transitions from one geometric shape to another geometric shape may be identified. For example, with respect to the Space Needle, the first tier 114 is tall and narrow, the second tier 116 resembles a disc, and the third tier 118 resembles a needle. These general characteristics may be recognized (e.g., based on pixels or dimensions), and transitions from one to the other may be determined to mark a boundary between two different 3D components. Dimensional data may be available or calculated for representations of real-world 3D objects (e.g., real-world buildings, landmarks), and this data may be analyzed to determine individual 3D components. A library of commonly used 3D objects and their 3D components may be maintained (such as at data store 804), and this library may be referenced for purposes of deconstructing the commonly used 3D objects. Accordingly, a 3D object may be automatically broken down into multiple 3D components in many different ways.

In addition to this automatic deconstruction, a user may manually identify a desired portion of a 3D object and select that portion as a 3D component (e.g., using a selection tool in a 3D drawing application). For example, a user could manually select the first tier 114 of the Space Needle by manually indicating a boundary around the first tier 114 using a selection tool. The selected portion may be analyzed by the deconstructing component 818 via the means described above, among others, to identify additional characteristics and subcomponents of the selected portion (e.g., if a user manually selects the first tier 114 of the Space Needle, this portion may be analyzed to identify the geometry of the individual legs that comprise the first tier 114). Thus, as mentioned, aspects hereof provide for an improved understanding of, and response to, a user input indicating a selection of a 3D object, as well as an improved understanding of the structure of 3D objects.

In FIG. 1B, the 3D components that are available for selecting and combining with other 3D components are indicated by selection windows 108, 110, and 112, which correspond to components 114, 116, and 118, respectively. These selection windows 108, 110, and 112 may be presented in a graphical user interface to visually indicate to a user that the corresponding components are available for selection.

Figure 2A:
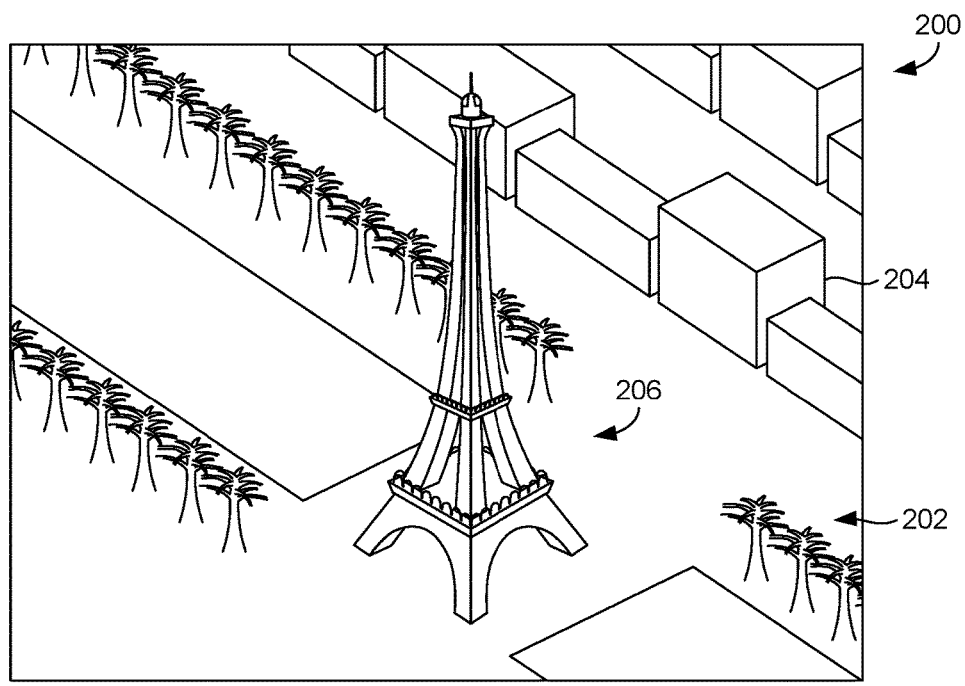
FIG. 2A shows a view of a 3D map that includes 3D objects, in accordance with aspects of the present disclosure.
Figure 2B:
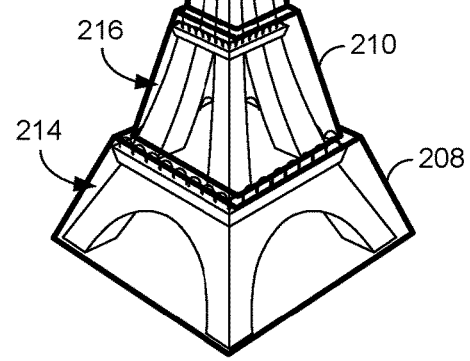
FIG. 2B shows a 3D object from the 3D map of FIG. 2A, wherein the 3D object has been broken down into multiple components, in accordance with aspects of the present disclosure.

Similar to FIGS. 1A-B, FIGS. 2A-B provide an additional example of a 3D map that includes 3D representations of architectural structures. In FIG. 2A, a view of a 3D map 200 is provided. The 3D map includes a 3D environment 202 having 3D objects 204 and 206. In this example, the 3D environment 202 is a portion of Paris, France, and the 3D object 206 is the Eiffel Tower. A user may wish to use the Eiffel Tower as a source of 3D components for combining with other 3D components. Accordingly, as discussed above, the user may select the 3D object 206, and the selected object may be broken down into multiple 3D components. FIG. 2B shows the 3D object 206 broken down into three different 3D components—a first tier 214, a second tier 216, and a third tier 218. This deconstruction may be performed automatically and/or manually, as described above. The 3D components that are available for selecting and combining with other 3D components are indicated by selection windows 208, 210, and 212, which correspond to components 214, 216, and 218, respectively. These selection windows 208, 210, and 212 may be presented in a graphical user interface in order to visually indicate to a user that the corresponding components are available for selection.

Figure 3:
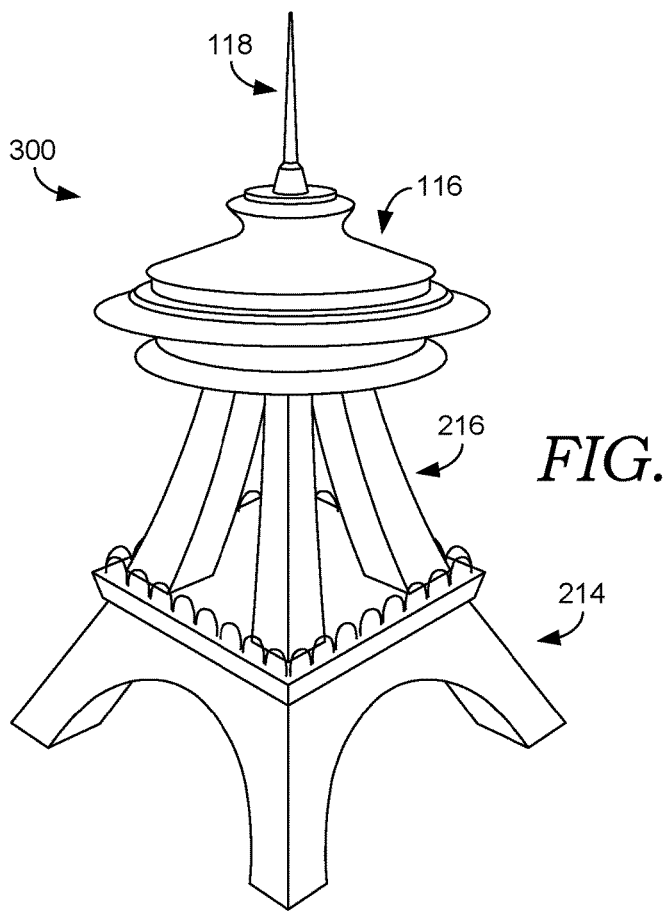
FIG. 3 shows a customized 3D object that includes 3D components from the 3D objects of FIG. 1B and FIG. 2B, in accordance with aspects of the present disclosure.

The recombining component 822 facilitates combining 3D components from various 3D sources in order to create a new 3D object. For example, in FIG. 3, the first tier 214 and the second tier 216 from the Eiffel Tower object 206 have been combined with the second tier 116 and the third tier 118 from the Space Needle object 106 in order to create a customized 3D object 300—a "Spaceffel" tower. The 3D object customization application may include a user interface that enables a user to rearrange, rotate, scale, and otherwise manipulate 3D components in order to create a customized 3D object using the components. Because the 3D components comprising an object have been determined, individual components may be easily reconfigured. For example, if a user wishes to change the color of a door on a building, the user need not manually paint the door using a paintbrush tool; instead, the door is recognized as a component, and the user can simply change the color of that particular component via the graphical user interface of the 3D object customization application.

Figure 4:
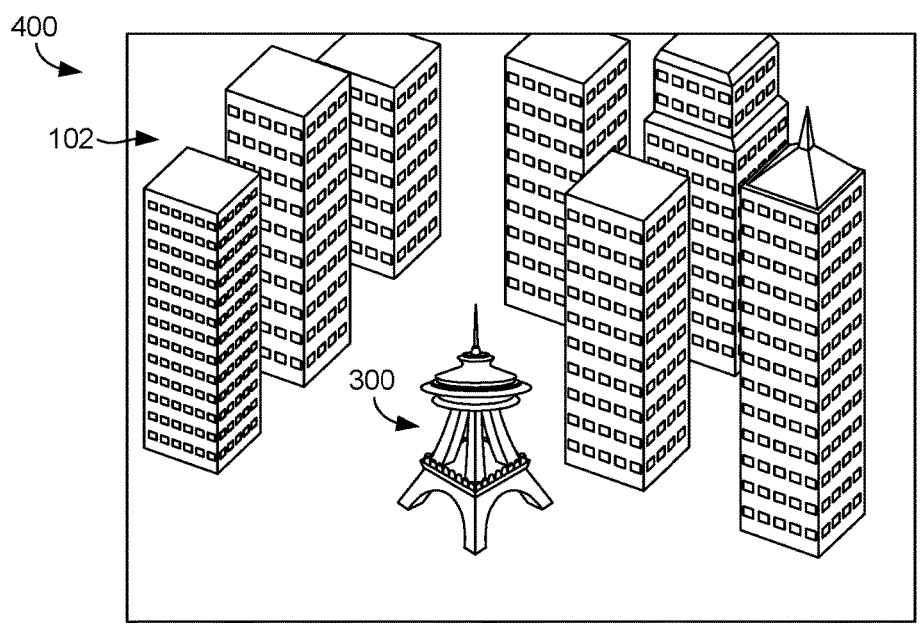
FIG. 4 shows a view of a 3D map that includes the customized 3D object of FIG. 3, in accordance with aspects of the present disclosure.

The customized 3D object 300 may be used for any number of purposes. For example, a user may transfer the customized 3D object 300 back to the map application 810 from which the source content was derived. The view of the 3D map 400 in FIG. 4 shows the customized 3D object 300 in the 3D environment 102 from which the 3D object 106 was originally taken. The user may also transfer the customized 3D object 300 to an augmented reality and/or virtual reality application, where the customized 3D object 300 is integrated into the augmented and/or virtual reality world, such that as a user navigates the world, the customized 3D object 300 appears to be a part of it. The customized 3D object 300 may be transferred to a video game (e.g., Minecraft World), a map application, or other application (e.g., a neighborhood or city designer application, a CAD program) for use in conjunction with such application. These applications may be personal to the user and/or may be shared among a community of users. For example, if a customized 3D object is added to a Minecraft World that is shared among multiple users, each of those users can view the customized 3D object and use the customized 3D object as a source of 3D content for generating his own customized 3D object (i.e. the customized 3D object may be deconstructed by another user and its components may be used to generate a new customized 3D object). The customized 3D object may also be stored at the data store 804 in a private location associated with a particular user and/or in a shared location that is accessible to a community of users. Transferring the customized 3D object 300 may be achieved by any number of means. For example, the user may copy and paste the customized 3D object 300. Additionally or alternatively, the user may save the customized 3D object 300 to a file that can be dropped into a desired application or storage location.

The customized 3D object 300 may include references to the source data that was used to create it. For example, metadata for the customized 3D object 300 may indicate that each of components 214 and 216 are associated with the Eiffel Tower in Paris, France, and that each of components 116 and 118 are associated with the Space Needle in Seattle, Wash. Accordingly, the creator of the customized 3D object 300 and/or another user with whom the customized 3D object is shared can determine a source from which each component originated. This information may be presented when a user hovers over the customized 3D object, when a user selects the customized 3D object, and/or in response to other user input.

In the example discussed above with respect to FIGS. 1-4, the user identified two different sources of 3D content (the Space Needle and the Eiffel Tower) and assembled components from each source in a desired manner In some instances, however, a user may desire assistance in identifying source content. Embodiments hereof enable users to search for sources of 3D content. At a high level, and as discussed in more detail below, this search functionality may be facilitated by the searching component 820 of the 3D object customization engine 808. For example, the 3D object customization engine may receive user-provided search criteria from the user, generate additional search criteria based on the user-provided search criteria, and pass the user-provided search criteria and/or the additional search criteria to the search engine 812. The search criteria may include dimensional data, age, architectural style, location, similarity to a specified structure, and any number of other search criteria. Based on the search criteria, the search engine 812 returns results, and those results are provided for display at a user interface associated with the 3D object customization application. The user may then select a particular search result and use it to create a customized 3D object, as discussed with respect to FIGS. 1-4.

A more detailed discussion of various search-related features is now provided. Suppose a user wishes to create a customized 3D object using the Space Needle as a starting point, but does not have a specific source of additional 3D content in mind. Or suppose a user wishes to create a customized 3D object, but has no starting point in mind. The user may initiate a search for 3D objects that satisfy one or more search criteria. For example, the user may initiate a search for 3D objects that have a particular architectural style or that originate from a particular region of the world. Architectural styles may include Ancient Roman, Baroque, Classical, Colonial, Gothic, Renaissance, Victorian, and any number of other styles. The user may search by city, country, or other geographic parameter. The 3D content against which the search is executed may include customized objects that were previously created by one or more users, such as those stored at data store 804. Thus, in response to a search for a location parameter corresponding to "Seattle+Paris," the "Spaceffel Tower" that was previously created as a customized object may be provided as a search result.

The user may also search for 3D objects that satisfy certain dimensional criteria. For example, a user might search for structures that have a particular height, width, or depth. Additionally or alternatively, a user might search for structures that have particular dimensional ratios, expressed as a numeric ratio and/or as a description (e.g., "height to width ratio of 5:1" or "tall and narrow"). Certain real estate properties or other structures may be associated with a price, and price may thus be provided as a search criteria. The user might also provide a known 3D object, or a component thereof, as search criteria. For example, a user that intends to modify the Space Needle might wish to search for 3D objects that have a similar structure. Accordingly, the user may provide the Space Needle, itself, as search criteria.

One or more user-provided search criteria may be received at the searching component 820 via a user interface associated with the 3D object customization application. The searching component 820 may generate additional search criteria based on the user input. For example, if the user provides a 3D object, such as the Space Needle, as search criteria, the searching component 820 may extract additional search parameters from that 3D object. For example, metadata associated with the 3D object may include geographic location, architectural style, age, price, and other characteristics. Dimensional data may be extracted from metadata and/or calculated. For example, a height, width, and depth of a real-world object (such as the Space Needle) may be calculated based on map data (e.g., using the apparent size of the object in a map and a scale of the map to determine an actual size of the object). Dimensional data for a virtual object (such as an object created in a virtual 3D drawing application) may be determined based on pixel measurements. A ratio of various dimensions of an object may also be calculated and provided as search criteria. Accordingly, as mentioned, aspects hereof provide for an improved understanding of a user input involving a 3D object.

The search criteria, including one or more of the user-provided search criteria and any additional criteria generated by the searching component 820 may be passed to the search engine 812. The search engine 812 may be integrated into the 3D object customization engine 808, it may be a separate search platform, or any combination of the foregoing. The search results returned by the search engine 812 may be provided for presentation at a graphical user interface associated with the 3D object customization application.

In some instances, a user might desire to replace a specific portion of a 3D object with a different 3D component. For example, a user may wish to replace the first tier of the Space Needle with a different 3D component that is similar in size. The user may provide the first tier, only, as search criteria in order to obtain suggestions for 3D components that are suitable for replacing the first tier. Based on this search criteria, the search results will include structures having components that are suitable replacements. Such particular components may be highlighted or otherwise indicated in the presentation of search results (e.g., if the third tier 218 of the Eiffel Tower is identified as a suitable replacement for the first tier 114 of the Space Needle, the Eiffel Tower may be presented as a search result, with the third tier 218 highlighted). Additionally or alternatively, the search results may include isolated components that are suitable replacements (e.g., if the third tier 218 of the Eiffel Tower is identified as a suitable replacement for the first tier 114 of the Space Needle, an isolated representation of the third tier 218 of the Eiffel Tower may be presented as a search result).

If a user specifies a 3D object or component thereof as search criteria, a search may be initiated for 3D objects that are similar in size. As used herein, "similar in size" refers to a degree of similarity that satisfies a predefined threshold. For example, two objects having heights, widths, and/or depths that satisfy the predefined threshold are deemed to be similar in size. The predefined threshold may be set at approximately 1%, 5%, 10%, 25%, or any number in between. Other predefined thresholds may also be used. If the predefined threshold is set at 1%, then two structures having a height, width, and/or depth that are within 1% of one another will be deemed to be similar in size. Similarity in size may also be determined based on relative dimensions. For example, if each of two objects has a height to width ratio of approximately 5 to 1, the two objects may be deemed to be similar in size, even if the absolute heights and widths are quite different. Accordingly, the requisite degree of similarity may account for the shape or geometry of an object. Two objects that are placed on top of one another and demonstrate a relatively close match (e.g., based on a requisite degree of similarity) are deemed to be similar. The requisite degree of similarity (e.g., the predefined thresholds) and the parameters utilized to determine similarity (e.g., dimensions, ratios) may be customizable. For example, these may be specified by a user.

The search results may include 3D objects and/or certain components of 3D objects, as well as information regarding the 3D objects. For example, information regarding a location, age, architectural style, or other information associated with a 3D object or component thereof may be included in the presentation of search results.

The search features described above may be implemented in response to a user command to initiate a search. Additionally or alternatively, they may be implemented automatically in response to a user selection of a 3D object. For example, when a user drops the Space Needle into the 3D object customization application, a search may be automatically initiated for objects that are suitable for mixing with the Space Needle. For example, objects that are similar in size and/or shape may be automatically suggested.

The user may navigate the graphical user interface associated with the 3D object customization application in order to select a particular search result and use it to create a customized 3D object, as discussed with respect to FIGS. 1-4.

The functionality described above may be implemented via a 3D object customization application and may also be made accessible to developers via application programming interfaces ("APIs"). For example, a developer may wish to develop an application for selling land for real estate development. The real estate application may utilize an API to implement the search functionality discussed above. For example, a user of the real estate application may input search criteria for finding a particular size (e.g., height, width, depth, number of stories) and style of residential or commercial structure, and may receive as output a number of 3D objects that satisfy this criteria. A user of the real estate application may then select a particular 3D object to be added to a parcel of land. This may be useful for real estate developers to help buyers envision the manner in which a parcel of land may be developed. APIs pertaining to the deconstructing and recombining functionality described above may also be provided.

The preceding examples focus largely on features associated with 3D maps. Three-dimensional maps and other geographic applications are valuable sources of 3D data, because they include complex, realistic, and recognizable 3D objects, including buildings, landmarks, bridges, and other structures. However, 3D content may be captured from other sources, as well, and utilized in the manner described above. Other potential sources include 3D drawing applications, virtual reality applications, video games, Internet downloads, and others. For example, a 3D object created in a CAD program may be combined with 3D components derived from 3D map objects (or other sources) in order to generate a customized 3D object. For example, a user may create a dream car by combining 3D components from multiple 3D car objects. The user could then transfer the dream car into a map feature associated with an application (e.g., a map associated with a virtual world). The user may view the car as the user navigates the virtual world. The user may also share the dream car and/or the virtual world with other users.

Figure 5:
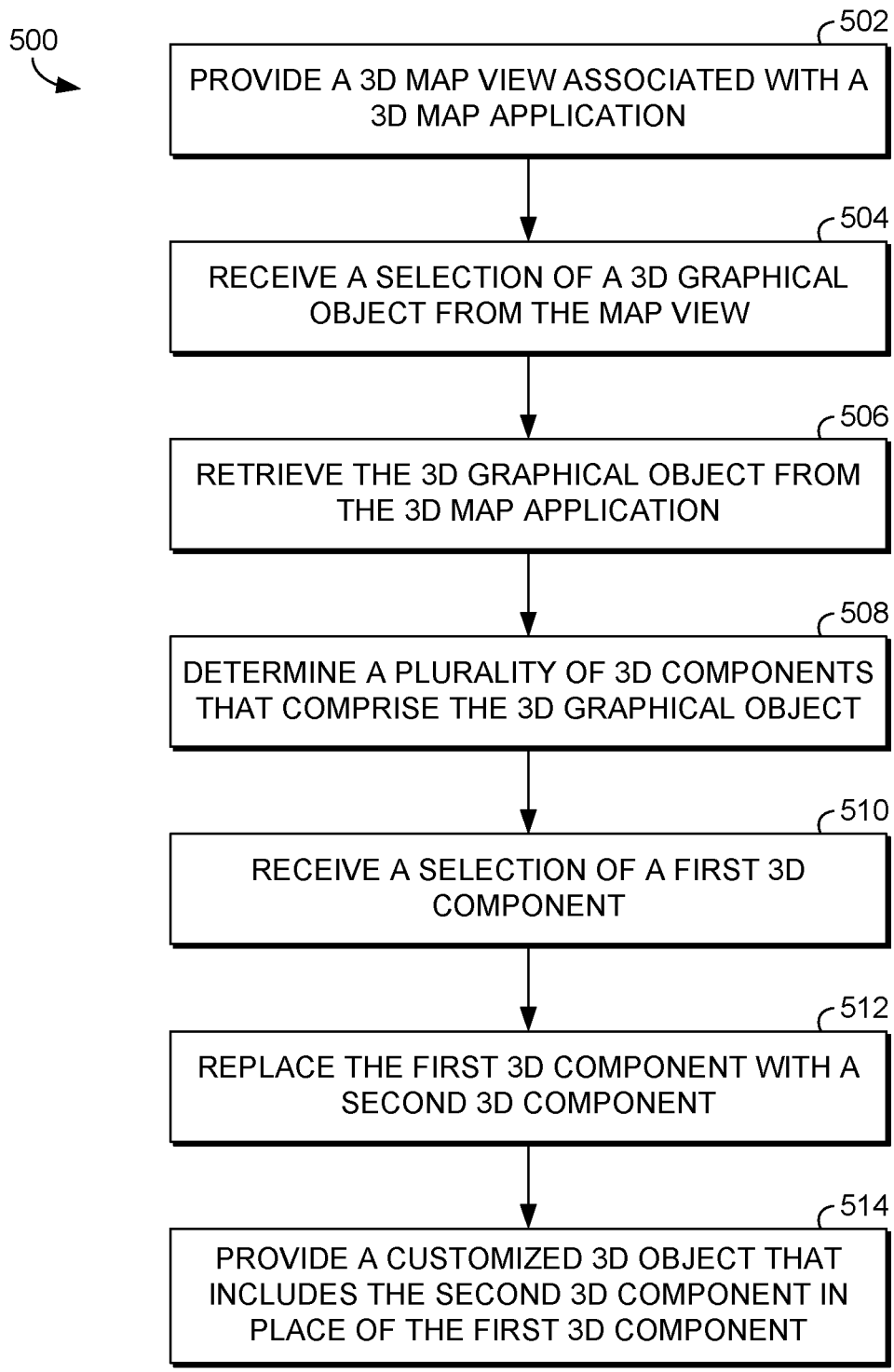
FIG. 5 depicts a flow diagram of a method for generating a customized 3D object, in accordance with aspects of the present disclosure.

Turning now to FIG. 5, a flow diagram of a method 500 for generating a customized 3D object is depicted, in accordance with aspects of the present disclosure. Method 500 could be performed by a computing device, such as user device 802 illustrated in FIG. 8 and/or computing device 900 illustrated in FIG. 9. The computing device can take the form of a laptop computer, a personal computer with detached display, a tablet computer, a smart phone, a holographic display, a virtual reality headset, an augmented reality headset, or some combination of the above or similar devices. Method 500 may be implemented by the 3D object customization engine 808.

At step 502, a 3D map view that is associated with a 3D map application, such as the 3D map application 810, is provided for presentation. The 3D map view includes a visual indication of the 3D objects 814 that are available for selection. At step 504, a selection of a 3D graphical object from the map view is received, and at step 506, in response to the selection, the retrieving component 816 retrieves the 3D graphical object from the 3D map application 810. At step 508, a plurality of 3D components that comprise the 3D graphical object is determined by the deconstructing component 818. A visual indication of the plurality of 3D components may be provided in order to aid a user in determining what components are available for selection.

At step 510, a selection of a first 3D component of the plurality of 3D components is received. The remainder of the 3D components may be considered unselected 3D components. At step 512, the first 3D component is replaced with a second 3D component. The second 3D component may be retrieved via the search functionality that is discussed with respect to FIG. 6 below. At step 514, a customized 3D object is provided for display by the recombining component 822. The customized 3D object includes the second 3D component and the unselected 3D components. In other words, the customized 3D object includes the second 3D component in place of the first 3D component. An indication of a source of the second 3D component may be provided. The indication of source may comprise a geographic location associated with the second 3D component. The customized 3D object may be provided to a virtual reality application, such that the customized 3D object is integrated into a virtual word associated with the virtual reality application.

Figure 6:
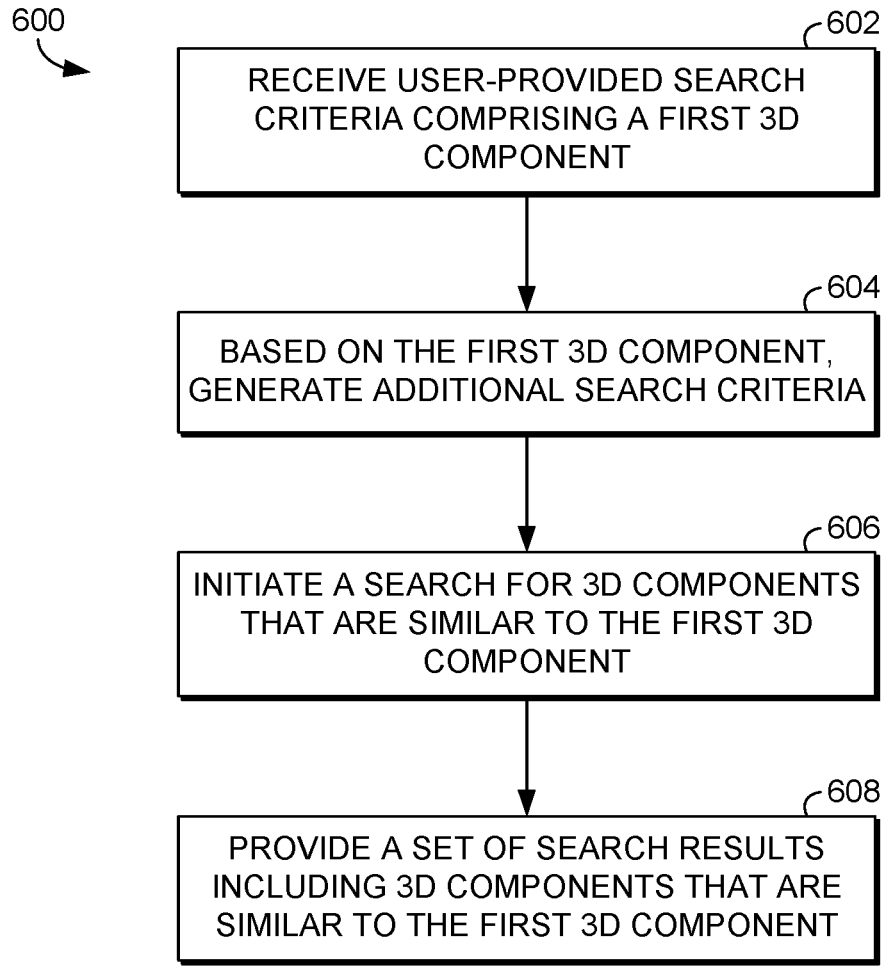
FIG. 6 depicts a flow diagram of a method for searching for 3D content, in accordance with aspects of the present disclosure.

Turning now to FIG. 6, a flow diagram of a method 600 for searching for 3D content is depicted, in accordance with aspects of the present disclosure. Method 600 could be performed by a computing device, such as user device 802 illustrated in FIG. 8 and/or computing device 900 illustrated in FIG. 9. Method 600 may be implemented by the 3D object customization engine 808.

At step 602, user-provided search criteria are received at the searching component 820. The user-provided search criteria include a first 3D component of a 3D object. At step 604, additional search criteria are generated by the searching component 820 based on the first 3D component. The additional search criteria may define characteristics of the first 3D component, such as dimensions of the first 3D component. Additionally or alternatively, the characteristics of the first 3D component may include an architectural style associated with the first 3D component or a 3D graphical object from which the first 3D component was derived.

At step 606, a search for 3D components that are similar to the first 3D component is initiated by the searching component 820. For example, the search may be intended to locate 3D components that have characteristics satisfying a requisite degree of similarity with respect to the characteristics of the first 3D component. The requisite degree of similarity may be a user-defined parameter. The requisite degree of similarity may be based on a dimension of the first 3D component and/or a ratio of dimensions associated with the first 3D component. Initiating the search for 3D objects that satisfy the requisite degree of similarity may comprise initiating a search for 3D components that are associated with an architectural style that is also associated with the 3D object from which the first 3D component was derived.

At step 608, a set of search results including 3D components that are similar to the first 3D component is provided by the searching component 820. For example, the set of search results may include 3D components having characteristics that satisfy the requisite degree of similarity.

The method may further include receiving a selection of a search result of the set of search results and, in response, utilizing the search result as a 3D component that replaces an existing 3D component of a particular 3D object.

Figure 7:
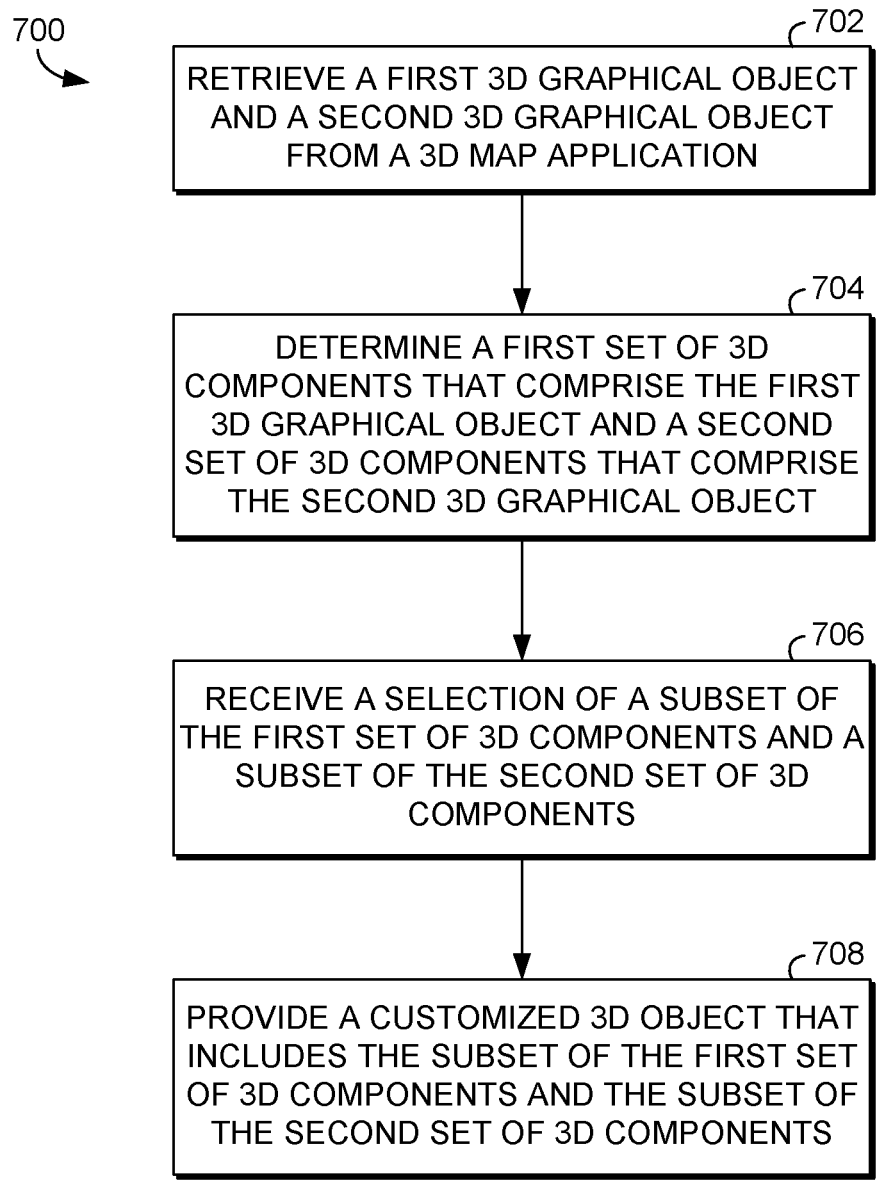
FIG. 7 depicts a flow diagram of a method for generating a customized 3D object, in accordance with aspects of the present disclosure.

Turning now to FIG. 7, a flow diagram of a method 700 for generating a customized 3D object is depicted, in accordance with aspects of the present disclosure. Method 700 could be performed by a computing device, such as user device 802 illustrated in FIG. 8 and/or computing device 900 illustrated in FIG. 9. Method 700 may be implemented by the 3D object customization engine 808.

At step 702, a first 3D graphical object and a second 3D graphical object are retrieved from a 3D map application by the retrieving component 816. These objects may be retrieved from a 3D map view associated with the 3D map application 810, as described above with respect to FIG. 5. At step 704, a first set of 3D components that comprise the first 3D graphical object and a second set of 3D components that comprise the second 3D graphical object are determined by the deconstructing component 818. Visual indications of the first set and second set of 3D components may be provided.

At step 706, a selection of a subset of the first set of 3D components and a subset of the second set of 3D components is received. In response to the selection, at step 708, a customized 3D object is provided for display by the recombining component 822. The customized 3D object includes the subset of the first set of 3D components and the subset of the second set of 3D components. An indication of a source of the subset of the first set of 3D components and a source of the subset of the second set of 3D components may be received. The indication of source may comprise a location, such as a geographic location associated with the first 3D graphical object and the second 3D graphical object, respectively.

Figure 9:
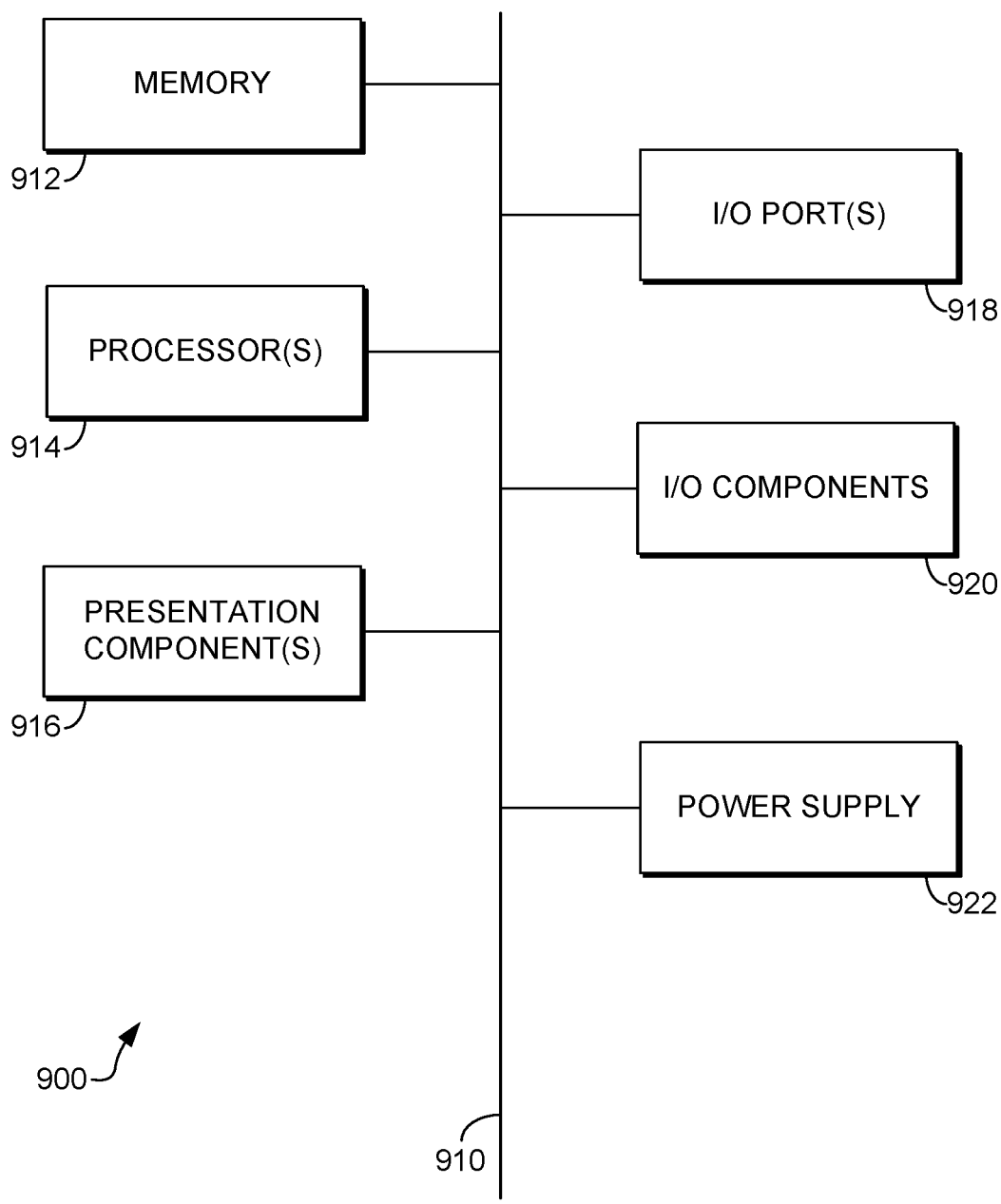
FIG. 9 is a block diagram of an exemplary computing environment suitable for use in implementing an aspect of the present disclosure.

Having described various implementations, an exemplary computing environment suitable for implementing aspects of the disclosure is now described. With reference to FIG. 9, an exemplary computing device is provided and referred to generally as computing device 900. The computing device 900 is but one example of a suitable computing environment and is not intended to suggest any limitation as to the scope of use or functionality of aspects of the disclosure. Neither should the computing device 900 be interpreted as having any dependency or requirement relating to any one or combination of components illustrated.

Aspects of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Aspects of the disclosure may be practiced in a variety of system configurations, including handheld devices, consumer electronics, general-purpose computers, more specialty computing devices, etc. Aspects of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 9, computing device 900 includes a bus 910 that directly or indirectly couples the following devices: memory 912, one or more processors 914, one or more presentation components 916, one or more input/output (I/O) ports 918, one or more I/O components 920, and an illustrative power supply 922. Bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 9 is merely illustrative of an exemplary computing device that can be used in connection with one or more aspects of the present disclosure. Distinction is not made between such categories as "workstation," "server," "laptop," "handheld device," etc., as all are contemplated within the scope of FIG. 9 and with reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data.

Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 912 includes computer storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors 914 that read data from various entities such as memory 912 or I/O components 920. Presentation component(s) 916 presents data indications to a user or other device. Exemplary presentation components include a display device, speaker, printing component, vibrating component, and the like.

The I/O ports 918 allow computing device 900 to be logically coupled to other devices, including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 900. The computing device 900 may be equipped with depth cameras, such as stereoscopic camera systems, infrared camera systems, RGB camera systems, and combinations of these, for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Some aspects of computing device 900 may include one or more radio(s) 924 (or similar wireless communication components). The radio 924 transmits and receives radio or wireless communications. The computing device 900 may be a wireless terminal adapted to receive communications and media over various wireless networks. Computing device 900 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the disclosure have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method of generating a customized three-dimensional (3D) graphical object, the method comprising:
   retrieving a 3D graphical object from a 3D map application, the 3D graphical object corresponding to a real-world geographical object;
   determining a plurality of 3D components that comprise the 3D graphical object;
   receiving a selection of a first 3D component of the plurality of 3D components, wherein a remainder of the plurality of 3D components comprise unselected 3D components;
   in response to the selection of the first 3D component, generating search criteria, the search criteria comprising characteristics of the real-world geographical object and the first 3D component;
   based on the search criteria, initiating a search for 3D components that satisfy a requisite degree of similarity with respect to the characteristics of the real-world geographical object and the first 3D component and providing a set of search results comprising a second 3D component;
   receiving a selection of the second 3D component from the set of search results;
   based on the selection of the second 3D component from the set of search results, replacing the first 3D component of the plurality of 3D components with the second 3D component; and
   providing for display the customized 3D object, the customized 3D object comprising the second 3D component and the unselected 3D components.

2. The method of claim 1, further comprising:
   receiving a selection of a search result of the set of search results; and
   in response to the selection of the search result, utilizing the search result as the second 3D component that replaces the first 3D component in the customized 3D object.

3. The method of claim 2, further comprising providing an indication of a source of the second 3D component.

4. The method of claim 3, wherein the indication of the source of the second 3D component comprises a geographic location associated with the second 3D component.

5. The method of claim 1, wherein the characteristics of the first 3D component comprise dimensions of the first 3D component.

6. The method of claim 1, further comprising providing for presentation a visual indication of the plurality of 3D components that comprise the 3D graphical object.

7. The method of claim 1, wherein the characteristics comprise an architectural style of the real-world geographical object.

8. The method of claim 1, further comprising providing the customized 3D object to a virtual reality application, wherein the customized 3D object is integrated into a virtual world associated with the virtual reality application.

9. The method of claim 1, wherein the requisite degree of similarity comprises a user-defined threshold.

10. The method of claim 1, further comprising:
    providing for presentation a 3D map view associated with the 3D map application, the 3D map view including a visual indication of 3D objects that are available for selection, the 3D objects that are available for selection including the 3D graphical object;
    receiving a selection of the 3D graphical object; and
    in response to the selection of the 3D graphical object, retrieving the 3D graphical object.

11. A computer system comprising:
    one or more processors; and
    one or more computer storage media storing computer-executable instructions that, when executed by the one or more processors, are configured to implement a method comprising:
      retrieving a three-dimensional (3D) graphical object from a 3D map application, the 3D graphical object corresponding to a real-world geographical object,
      determining a plurality of 3D components that comprise the 3D graphical object,
      receiving a selection of a first 3D component of the plurality of 3D components, in response to the selection of the first 3D component, generating search criteria, the search criteria comprising characteristics of the real-world geographical object and the first 3D component, based on the search criteria, initiating a search for 3D components that satisfy a requisite degree of similarity with respect to the characteristics of the real-world geographical object and the first 3D component, providing for presentation a set of search results comprising 3D objects having 3D components that satisfy the requisite degree of similarity, receiving a selection of a search result of the set of search results, the selected search result comprising a second 3D component, in response to the selection of the search result, replacing the first 3D component of the plurality of 3D components with the second 3D component, and providing for display a customized 3D object comprising the second 3D component in place of the first 3D component.

12. The system of claim 11, wherein the method further comprises providing for presentation a visual indication of the plurality of 3D components that comprise the 3D graphical object.

13. The system of claim 11, wherein the characteristics comprise a dimension of the first 3D component.

14. The system of claim 11, wherein the characteristics comprise a ratio of dimensions associated with the real-world geographical object.

15. The system of claim 11, wherein the method further comprises initiating a search for 3D components that are associated with an architectural style that is also associated with the 3D graphical object.

16. One or more computer storage media having computer-executable instructions embodied thereon that, when executed by a computing device having a processor and a memory, cause the computing device to perform a method comprising:

determining a plurality of 3D components that comprise a 3D graphical object, the 3D graphical object corresponding to a geographical object;

receiving a selection of a first 3D component of the plurality of 3D components, wherein a remainder of the plurality of 3D components comprise unselected 3D components;

based on the selection of the first 3D component, generating search criteria, the search criteria comprising characteristics of the geographical object and the first 3D component;

based on the search criteria, initiating a search for 3D components that satisfy a requisite degree of similarity with respect to the characteristics of the geographical object and the first 3D component and providing a set of search results comprising a second 3D component;

receiving a selection of the second 3D component from the set of search results;

based on the selection of the second 3D component from the set of search results, replacing the first 3D component of the plurality of 3D components with the second 3D component; and providing for display the customized 3D object, the customized 3D object comprising the second 3D component and the unselected 3D components.

17. The one or more computer storage media of claim 16, wherein the method further comprises providing an indication of a source of the second 3D component.

18. The one or more computer storage media of claim 17, wherein the indication of the source comprises a location associated with the second 3D component.

19. The one or more computer storage media of claim 16, wherein the method further comprises providing for presentation a visual indication of the plurality of 3D components that comprise the 3D graphical object.

20. The one or more computer storage media of claim 16, wherein the method further comprises providing the customized 3D object to video game application.

* * * * *